(12) United States Patent
Wurtenberger et al.

(10) Patent No.: US 8,509,699 B1
(45) Date of Patent: Aug. 13, 2013

(54) METHOD AND SYSTEM FOR ADJUSTING ACCESS PARAMETERS IN RESPONSE TO SURGES IN PAGING BUFFER OCCUPANCY

(75) Inventors: Andrew Wurtenberger, Olathe, KS (US); Caleb Hyde, Kansas City, MO (US); Manasa Keshavachandra, Virginia Beach, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 828 days.

(21) Appl. No.: 12/564,363

(22) Filed: Sep. 22, 2009

(51) Int. Cl.
*H04W 68/00* (2009.01)

(52) U.S. Cl.
USPC ....... 455/67.11; 455/518; 455/519; 455/38.1; 455/466; 455/522; 455/434; 455/515; 455/458; 455/567; 455/435.1

(58) Field of Classification Search
USPC ............. 455/67.11, 518, 519, 38.1, 466, 522, 455/434, 515, 458, 435.1, 567; 370/458, 370/465, 442, 326, 336, 328–329, 347
See application file for complete search history.

(56) References Cited

U.S. PATENT DOCUMENTS

| | | | |
|---|---|---|---|
| 5,650,770 A | 7/1997 | Schlager et al. | |
| 5,940,743 A | 8/1999 | Sunay et al. | |
| 5,963,130 A | 10/1999 | Schlager et al. | |
| 6,002,664 A | 12/1999 | Schachter | |
| 6,154,638 A | 11/2000 | Cheng et al. | |
| 6,198,390 B1 | 3/2001 | Schlager | |
| 6,243,575 B1 | 6/2001 | Ohyama et al. | |
| 6,307,846 B1 * | 10/2001 | Willey | 370/329 |
| 6,341,224 B1 | 1/2002 | Dohi et al. | |
| 6,442,393 B1 | 8/2002 | Hogan | |
| 6,463,286 B1 | 10/2002 | Salminen | |
| 6,490,460 B1 | 12/2002 | Soliman | |
| 6,496,531 B1 | 12/2002 | Kamel et al. | |
| 6,535,736 B1 | 3/2003 | Balogh et al. | |
| 6,603,976 B1 | 8/2003 | Amirijoo et al. | |
| 6,609,008 B1 | 8/2003 | Whang et al. | |
| 6,754,501 B1 * | 6/2004 | McRae et al. | 455/453 |
| 6,763,244 B2 | 7/2004 | Chen et al. | |
| 6,845,245 B2 | 1/2005 | Hunzinger | |

(Continued)

FOREIGN PATENT DOCUMENTS

WO 2006/044714 A1 4/2006

OTHER PUBLICATIONS

3rd Generation Partnership Project 2, "cdma2000 High Rate Packet Data Air Interface," 3GPP2 C.S0024-B, v. 2.0 (Mar. 2007).

*Primary Examiner* — Andrew Wendell
*Assistant Examiner* — Ganiyu A Hanidu

(57) ABSTRACT

A radio access network (RAN) accumulates page messages in a paging buffer for subsequent transmission into a wireless coverage area. A buffer monitor is configured to periodically monitor the occupancy of the paging buffer and to detect when there is a surge in the paging buffer occupancy (e.g., when the occupancy increases by at least a threshold amount during an evaluation time period). When the buffer monitor detects a surge in paging buffer occupancy, the RAN transmits a control message that changes one or more access parameters that mobile stations operating in the wireless coverage area use to determine when to transmit responses to page messages. Because of the changed access parameters, mobile stations that receive page messages in the same time period are less likely to transmit responses in the same access cycle channel, thereby reducing the possibility of access probe collisions.

16 Claims, 4 Drawing Sheets

(56) References Cited

U.S. PATENT DOCUMENTS

| | | |
|---|---|---|
| 6,845,246 B1 | 1/2005 | Steer |
| 6,845,248 B1 | 1/2005 | Johnson |
| 6,968,201 B1 | 11/2005 | Gandhi et al. |
| 7,010,329 B2 | 3/2006 | Livet et al. |
| 7,024,217 B2 | 4/2006 | Hunzinger |
| 7,149,535 B1 * | 12/2006 | Chaturvedi et al. ............ 455/458 |
| 7,215,653 B2 | 5/2007 | Kim et al. |
| 7,221,653 B2 | 5/2007 | Vanghi |
| 7,228,134 B2 | 6/2007 | Gandhi et al. |
| 7,260,415 B1 | 8/2007 | Oh |
| 7,356,346 B2 | 4/2008 | Gopalakrishnan et al. |
| 7,421,248 B1 | 9/2008 | Laux et al. |
| 7,466,682 B1 | 12/2008 | Ribas et al. |
| 7,480,501 B2 * | 1/2009 | Petite ......................... 455/404.1 |
| 7,636,322 B1 | 12/2009 | Gandhi et al. |
| 7,668,561 B2 | 2/2010 | Au et al. |
| 8,089,879 B2 * | 1/2012 | Hu et al. ......................... 370/235 |
| 8,194,562 B1 | 6/2012 | Gandhi et al. |
| 8,254,874 B1 * | 8/2012 | Oroskar et al. ............ 455/404.1 |
| 2002/0123362 A1 | 9/2002 | Kamel et al. |
| 2003/0076804 A1 * | 4/2003 | Sivalingham .................. 370/338 |
| 2004/0157626 A1 * | 8/2004 | Park et al. ......................... 455/458 |
| 2004/0165529 A1 | 8/2004 | Lee |
| 2006/0116151 A1 * | 6/2006 | Sullivan et al. ............... 455/519 |
| 2006/0142051 A1 | 6/2006 | Purnadi et al. |
| 2006/0268768 A1 * | 11/2006 | Harris et al. .................... 370/328 |
| 2007/0049314 A1 * | 3/2007 | Balachandran et al. ....... 455/518 |
| 2007/0149235 A1 | 6/2007 | Chin et al. |
| 2008/0004050 A1 | 1/2008 | Bi et al. |
| 2008/0146253 A1 * | 6/2008 | Wentink ......................... 455/458 |

\* cited by examiner

METHOD AND SYSTEM FOR ADJUSTING ACCESS PARAMETERS IN RESPONSE TO SURGES IN PAGING BUFFER OCCUPANCY

BACKGROUND

In a conventional approach, a radio access network (RAN) transmits a page message into a wireless coverage area (such as a cell or sector) where a mobile station may be operating in order to contact the mobile station regarding an incoming call. If the mobile station receives the page message, the mobile station may transmit a response over an access channel. Transmissions over the access channel may be in the form of one or more access probes. Thus, to transmit a response to a page message, a mobile station may transmit a series of access probes in the access channel.

In many cases, the access channel is a shared channel that multiple mobile stations in the wireless coverage area are able to use to transmit messages to the RAN. Thus, when one mobile station is transmitting access probes to respond to a page message, another mobile station may also be transmitting access probes at the same time (either to transmit a response to a page message or to transmit some other type of message). This may cause a "collision" between the mobile stations' access probes, which may result in the RAN being unable to decode the access probes from either mobile station.

Various approaches for reducing the possibility of access probe collisions have been proposed. One such approach is used in Evolution Data-Optimized (EVDO) air interfaces. A recent version of EVDO is described in the following technical specification: $3^{rd}$ Generation Partnership Project 2, "cdma2000 High Rate Packet Data Air Interface," 3GPP2 C.S0024-B, v. 2.0 (March 2007), which is fully incorporated herein by reference. In this approach, a mobile station uses a "persistence test" to determine when the mobile station can begin transmitting access probes in the access channel. The persistence test uses a "persistence parameter," n, that is set by the RAN. To perform the persistence test, the mobile station calculates a persistence probability, p, by the formula, $p = 2^{-n/4}$. See EVDO Specification, page 9-47. The mobile station also generates a pseudorandom number, x, where $0 \leq x \leq 1$, and compares the values of p and x. See EVDO Specification, pages 9-42 and 13-5. If x<p, the persistence test is said to succeed, and the mobile station may transmit an access probe in the first upcoming access channel cycle. Otherwise, the mobile station waits for a silence period and then repeats the persistence test before transmitting the access probe. See EVDO Specification, page 9-42.

By choosing an appropriate value of n, this approach can reduce the possibility of access probe collisions. For example, n can be chosen so as to set a desirably small probability of having two mobile stations that receive page messages during the same time period both transmitting responses during the same access channel cycle.

OVERVIEW

In a first principal aspect, an exemplary embodiment provides a method for a radio access network (RAN) that accumulates page messages in a paging buffer for subsequent transmission into a wireless coverage area. In accordance with the method, a surge in occupancy of the paging buffer is detected. In response to the surge, a change is made to at least one access parameter that affects when mobile stations operating in the wireless coverage area transmit responses to page messages transmitted by the RAN.

In a second principal aspect, an exemplary embodiment provides a method for a radio access network (RAN). In accordance with the method, page messages are accumulated in a paging buffer during an evaluation time period. The RAN determines that occupancy of the paging buffer has increased by at least a threshold amount during the evaluation time period and responsively transmits a control message. The control message affects when mobile stations respond to page messages transmitted by the RAN. The RAN subsequently transmits at least some of the page messages that accumulated in the paging buffer during the evaluation time period.

In a third principal aspect, an exemplary embodiment provides a system comprising a radio frequency (RF) interface for wireless communication with mobile stations, a paging buffer for accumulating page messages for subsequent transmission by the RF interface, and a buffer monitor. The buffer monitor is configured to (i) periodically monitor occupancy of the paging buffer, (ii) detect surges in occupancy of the paging buffer, and (iii) in response to a detected surge, cause the RF interface to transmit a control message that affects when mobile stations respond to page messages transmitted by the RF interface.

DETAILED DESCRIPTION OF EXEMPLARY EMBODIMENTS

1. Introduction

Figure 1:
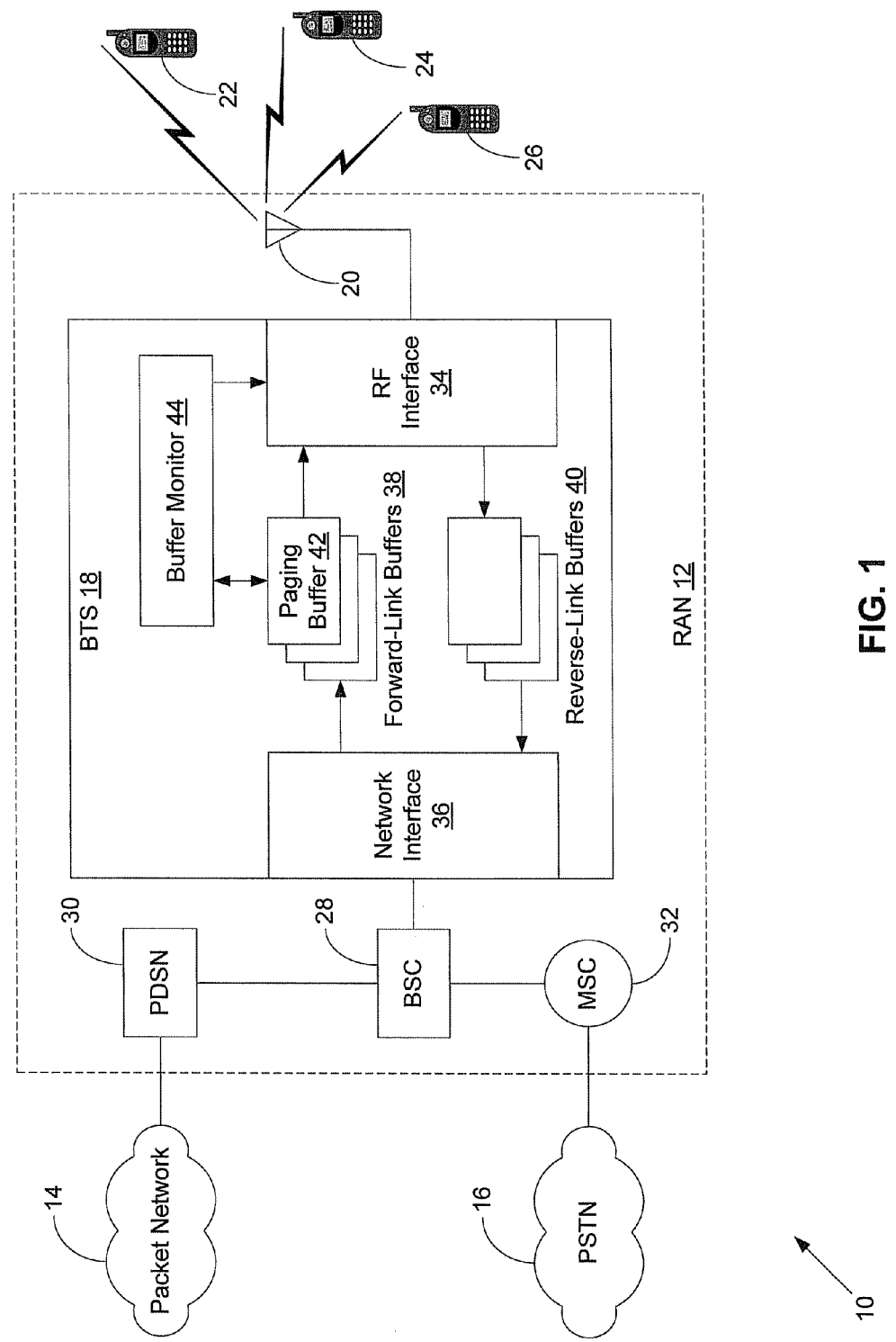
FIG. 1 is a schematic diagram illustrating a wireless telecommunications system, in accordance with an exemplary embodiment.

The inventors have recognized that conventional approaches for limiting the possibility of access probe collisions can lead to inefficiencies. For example, in conventional "persistence test" approaches, as the value of the persistence parameter is increased, the probability of access probe collisions will be reduced because the probability of a given mobile station's persistence test being successful during a given access channel cycle is reduced. However, by reducing the probability of obtaining a successful persistence test, mobile stations will, on average, also take longer to respond to page messages. That, in turn, may increase the time it takes to connect incoming calls to mobile stations.

As an alternative, the inventors propose systems and methods that enable the radio access network (RAN) to dynamically adjust one or more access parameters that affect when mobile stations respond to page messages, in order to accommodate changing conditions. One such condition that may justify a change in access parameters for a given wireless coverage area is a sudden increase in the number of page messages intended for that wireless coverage area. For example, a group call to multiple mobile stations that may be operating in a given wireless coverage area may lead to a temporary increase in the number of page messages that are generated for that wireless coverage area. The increase may be detected as a surge in the occupancy of a paging buffer that accumulates page messages for subsequent transmission into to the wireless coverage area. Because of the surge, the RAN may transmit multiple page messages at about the same time. In order to limit the possibility that multiple mobile stations will transmit responses at about the same time—a situation that could result in access probe collisions—the RAN may provide adjusted access parameters.

Thus, the RAN may periodically monitor the occupancy of the paging buffer for a wireless coverage area. In response to detecting a surge in the occupancy of the paging buffer, the RAN may transmit a control message that affects when mobile stations operating in the wireless coverage area transmit responses to page messages transmitted by the RAN. For an EVDO air interface, in which mobile stations use a persistence test to determine when to transmit a response to a page message, the RAN's control message could be an AccessParameters message that includes updated values of persistence parameters that lower the probabilities of persistence tests being successful. The updated values could apply only temporarily, e.g., when the occupancy of the paging buffer is unusually high. When the surge has passed, the RAN may transmit another control message that returns the persistence parameters to default values. The surge may be deemed to have passed when an exit condition has been detected, such as detecting that the occupancy of the paging buffer or a rolling average of the occupancy of the paging buffer has fallen to a predetermined level, e.g., a level that corresponds to a typical occupancy level.

In this way, the RAN may adjust access parameters (such as persistence parameters) to respond to changing conditions (such as surges in the occupancy of a paging buffer), in order to limit the possibility of access probe collisions.

2. Exemplary Network Architecture

FIG. 1 illustrates a wireless telecommunications system 10 in which exemplary embodiments may be employed. System 10 includes a radio access network (RAN) 12, which may be connected to other networks, such as packet network 14 and/or public switched telephone network (PSTN) 16. RAN 12 may include one or more base transceiver stations (BTSs), each of which provides wireless coverage in one or more wireless coverage areas (such as cells or sectors). For purposes of illustration, FIG. 1 shows only BTS 18 in RAN 12. It is to be understood, however, that RAN 12 may include a plurality of BTSs.

BTS 18 includes an antenna system 20 for wireless communication with mobile stations, such as mobile stations 22, 24, and 26. It is to be understood that antenna system 20 may include multiple antennas, which may be used for transmitting wireless signals to mobile stations, receiving wireless signals from mobile stations, or both transmitting and receiving. Antenna system 20 may include directional antennas so as to provide wireless coverage in a particular sector (in which case BTS 18 may include other antenna systems to provide wireless coverage in other sectors). Alternatively, antenna system 20 could be omni-directional.

Mobile stations 22, 24, and 26 could be wireless telephones, wireless personal digital assistants, wirelessly-equipped laptop computers, or other types of wireless communication devices. Mobile stations 22, 24, and 26 may engage in wireless communication with BTS 18 in order to exchange voice, data, video, or other media with endpoints such as other mobile stations, landline stations, or servers (e.g., via packet network 14 or PSTN 16). The wireless communication between BTS 18 and mobile stations 22, 24, and 26 may use an air interface format, such as EVDO, 1xRTT CDMA, GSM, or other type of air interface format.

BTS 18 may be controlled by a base station controller (BSC) 28, which may be communicatively coupled to packet network 14 and/or PSTN 16. For example, BSC 28 may be communicatively coupled to packet network 14 via a packet data serving node (PDSN) 30. Alternatively or additionally, BSC 28 may be communicatively coupled to PSTN 16 via a mobile switching center (MSC) 32. Although RAN 12 is shown with only one BSC, one PDSN, and one MSC, it is to be understood that RAN 12 could include multiple BSCs, PDSNs, and/or MSCs. Further, the configuration of RAN 12 shown in FIG. 1 is exemplary only, as RAN 12 could be communicatively coupled to networks (packet network 14, PSTN 16, or other types of networks) in other ways.

BTS 18 may include a number of functional components. For example, BTS 18 may include an RF interface 34 for wireless communication with mobile stations via antenna system 20, and BTS 18 may include a network interface 36 for communicating with BSC 28. Network interface 36 may receive forward-link communications from BSC 28, which BTS 18 then transmits to mobile stations via RF interface 34. RF interface 34 may receive reverse-link communications from mobile stations, which BTS 18 then transmits to BSC 28 via network interface 36.

BTS 18 may include one or more buffers for accumulating communications for subsequent transmission. For example, BTS 18 may include forward-link buffers 38 for accumulating forward-link communications for subsequent transmission to mobile stations via RF interface 34 and reverse-link buffers 40 for accumulating reverse-link communications for subsequent transmission to BSC 28 via network interface 36. Forward-link buffers 38 may include a paging buffer 42 for accumulating page messages for subsequent transmission to mobile stations (such as mobile stations 22, 24, and 26) via RF interface 34.

BTS 18 may also include a buffer monitor 44 for monitoring the occupancy of paging buffer 42. As described in more detail below, buffer monitor 44 may periodically monitor the occupancy of paging buffer 42 to detect when surges in occupancy occur. When a surge is detected, buffer monitor 44 may cause RF interface 34 to transmit a control message with updated access parameters. The updated access parameters may affect when mobile stations respond to page messages, so as to reduce the possibility of access probe collisions. Thus, in the case that the mobile stations use a persistence test to determine when to transmit responses to page messages, the updated access parameters could be updated values of a persistence parameter, n, which may result in updated values of a persistence probability, p, calculated by the formula, $p=2^{-n/4}$.

Buffer monitor 44 may select the updated access parameters based on the occupancy of paging buffer 42. To do this, buffer monitor 44 may refer to a table that associates the number of page messages in paging buffer 42 with corresponding values of access parameters, such as n and/or p, which buffer monitor 44 may then include in the control message. Table 1 below is an example of such a table:

TABLE 1

| Page messages | n | p |
|---|---|---|
| <8 | 0 | 1.00 |
| 8 to 15 | 1.0 | 0.84 |
| 16 to 23 | 2.0 | 0.71 |
| 24 to 31 | 3.0 | 0.59 |

TABLE 1-continued

| Page messages | n | p |
|---|---|---|
| 32 to 63 | 4.0 | 0.50 |
| ≧64 | 8.0 | 0.25 |

Although FIG. 1 shows buffer monitor 44 as a functional component of BTS 18, this function could alternatively be performed in other elements of system 10 (e.g., in BSC 28). Further, though certain functional components of BTS 18 are shown in FIG. 1 for purposes of illustration, it is to be understood that BTS 18 may include additional and/or different functional components.

3. Exemplary Operation

Figure 2:
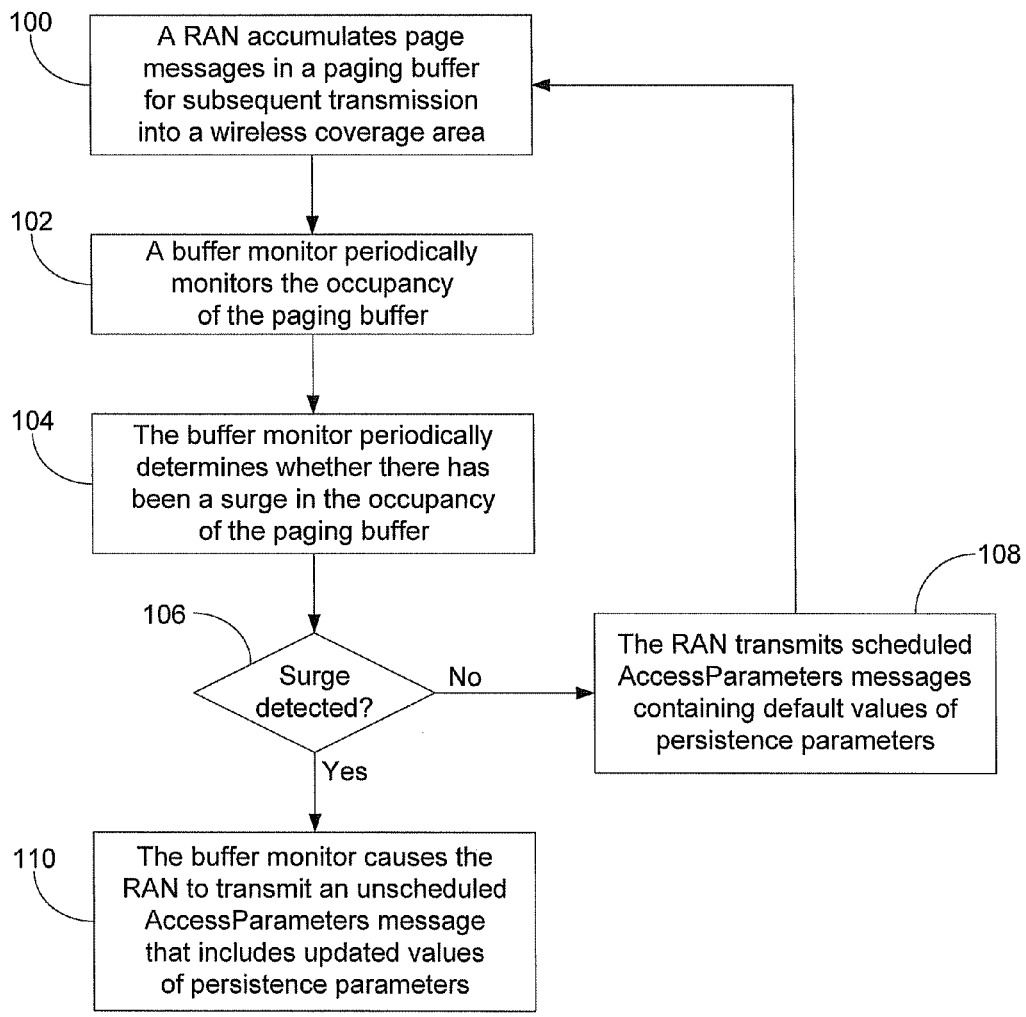
FIG. 2 is a flow chart illustrating a method of operation, in accordance with an exemplary embodiment.
Figure 3:
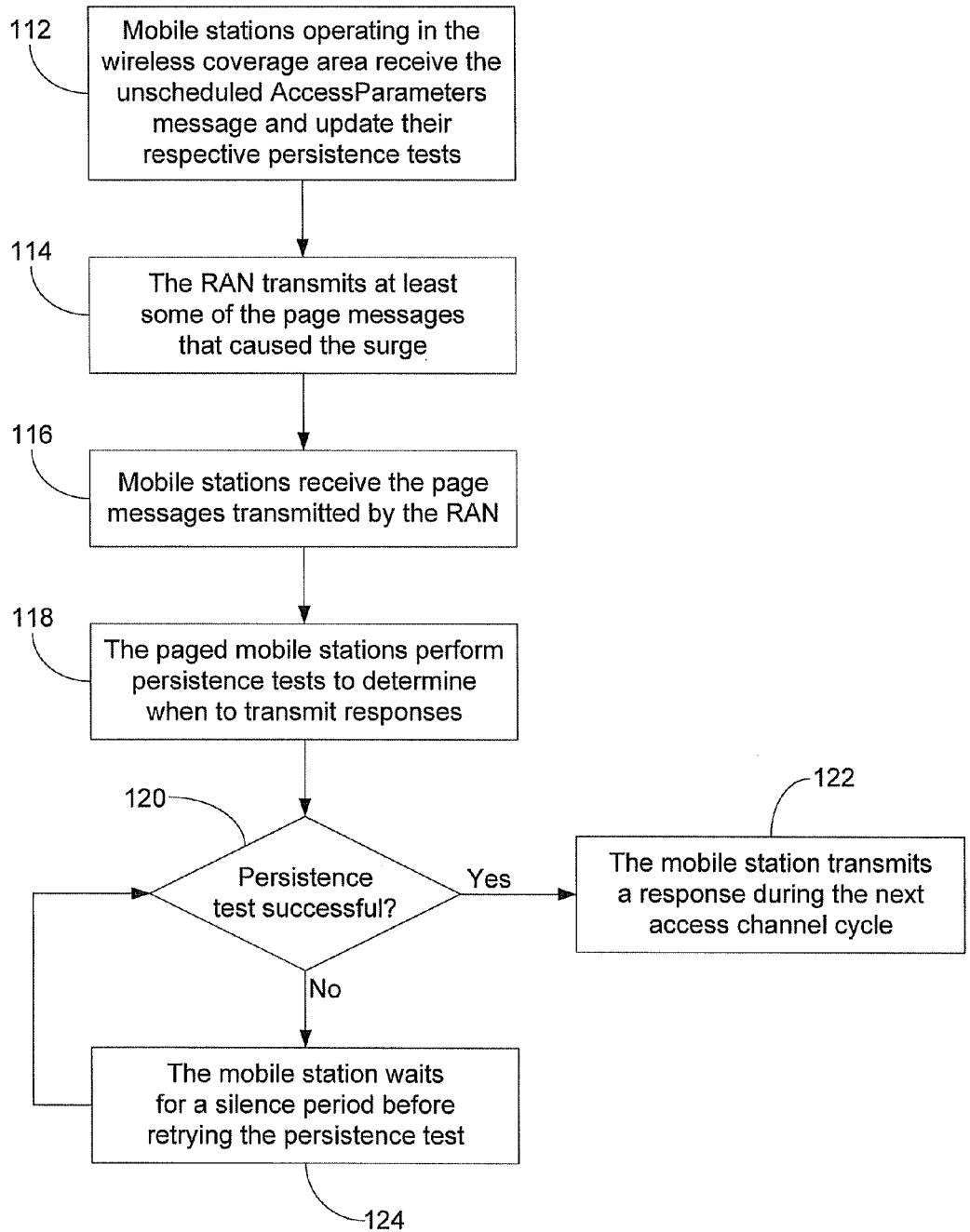
FIG. 3 is a flow chart illustrating a method of operation, in accordance with an exemplary embodiment.

FIGS. 2 and 3 illustrate exemplary methods of operation. The following discussion of these exemplary methods assumes the network architecture shown in FIG. 1 and an EVDO air interface. It is to be understood, however, that other network architectures and/or air interface formats could be used.

With reference to FIG. 2, a RAN accumulates page messages in a paging buffer (e.g., paging buffer 42) for subsequent transmission into a wireless coverage area (such as a cell or sector), as indicated by block 100. A buffer monitor (e.g., buffer monitor 44) periodically monitors the occupancy of the paging buffer, as indicated by block 102. For example, the timing of forward-link and reverse-link transmissions may be based on "time slots" that are synchronized to a system time maintained by the RAN. Each time slot may be a fixed period of time, such as 1.67 milliseconds. The buffer monitor may be configured to check the occupancy of the paging buffer every set number of time slots, for example, every 32 time slots.

The buffer monitor periodically determines whether there has been a surge in the occupancy of the paging buffer, as indicated by block 104. The buffer monitor may make this determination as frequently as it checks the occupancy of the paging buffer (e.g., after each time that it checks the occupancy), or the buffer monitor may make this determination less frequently.

A surge may be indicated when the number of page messages in the paging buffer has increased by at least a threshold amount, S, during a defined time period. The defined time period could be the period of time since the immediately preceding occupancy check or a longer period of time. For example, the buffer monitor may find $N_1$ page messages in the paging buffer at a first time $t_1$ and may find $N_2$ page messages in the paging buffer at a second time, $t_2$. The first time, $t_1$, and the second time, $t_2$, could be consecutive times that the buffer monitor evaluates the occupancy of the paging buffer. Thus, in the case that the buffer monitor evaluates occupancy every 32 time slots, the first and second times could be 32 time slots apart. The buffer monitor would then determine whether $N_2$ exceeds $N_1$ by at least the threshold amount. If $N_2-N_1 \geq S$, then the buffer monitor may detect a surge.

How the method proceeds may depend on whether the buffer monitor has detected a surge, as indicated by block 106. If no surge is detected, then default values of access parameters (such as persistence parameters) may continue to apply. In an EVDO air interface, the RAN may transmit an AccessParameters message containing default persistence parameters (different persistence parameters may apply to different classes of mobile station) in accordance with a schedule. For example, the RAN may transmit a scheduled AccessParameters message every four control channel cycles (each control channel cycle may be 256 time slots long). Thus, unless a surge is detected, the RAN may transmit scheduled AccessParameters messages containing default values of persistence parameters, as indicated by block 108.

On the other hand, if a surge is detected, the RAN may not wait until the next scheduled AccessParameters message in order to provide updated values of access parameters. Instead, the RAN may transmit an unscheduled AccessParameters message, for example, at the earliest opportunity available. Thus, if a surge is detected, the buffer monitor may cause the RAN to transmit an unscheduled AccessParameters message that includes updated values of persistence parameters, as indicated by block 110.

The surge could be caused, for example, by a group call to a group of mobile stations. The updated values of persistence parameters may increase the probability that the mobile stations in the group, which may receive page messages for the group call at about the same time, transmit responses at different times.

FIG. 3 is a flow chart illustrating how the method may continue after a surge has been detected and the RAN has transmitted an unscheduled AccessParameters message containing updated values of persistence parameters. In an exemplary embodiment, the unscheduled AccessParameters message is transmitted in only the wireless coverage area associated with the paging buffer in which the surge was detected. Thus, mobile stations operating in that wireless coverage area may receive the unscheduled AccessParameters message and may update their respective persistence tests with the updated values of the persistence parameters, as indicated by block 112. As a result, when a mobile station next performs a persistence test, the mobile station will use the updated value of the persistence parameter from the unscheduled AccessParameters message, instead of the default value of the persistence parameter that the mobile station received from the most recent scheduled AccessParameters message.

After transmitting the unscheduled AccessParameters message, the RAN may transmit at least some of the page message that cause the surge, as indicated by block 114. Mobile stations operating in the wireless coverage area may receive the page messages transmitted by the RAN, as indicated by block 116. The paged mobile stations perform persistence tests to determine when the transmit responses to the page messages, as indicated by block 118.

For an EVDO air interface, a mobile station may perform a persistence test by calculating the persistence parameter, p, by the formula $p=2^{-n/4}$, where n is a persistence parameter from the unscheduled AccessParameters message (e.g., the persistence parameter that applies to the mobile station's respective class). The mobile station may then compare p to x, a pseudorandom number between 0 and 1. If x<p, the persistence test is successful. Otherwise, the persistence test is unsuccessful, except that the persistence test may be deemed successful if the number of consecutive unsuccessful persistence tests exceeds 4/p.

Whether the mobile station begins transmitting a response to the page message, or delays transmission of the response, depends on whether the persistence test is successful, as indicated by block 120. If the persistence test is successful, then the mobile station transmits a response during the next access channel cycle, as indicated by block 122. If the persistence test is unsuccessful, the mobile station waits for a silence period before retrying the persistence test, as indicated by 124.

In this way, the RAN may respond expeditiously to a surge in the occupancy of the paging buffer by transmitting an unscheduled AccessParameters message that provides updated values of persistence parameters. The updated values of the persistence parameters may reduce the probability of a persistence test being successful, as compared to the default values of the persistence parameters. As a result, the mobile stations will, on average, take longer to transmit access probes to respond to the page messages transmitted by the RAN, thereby reducing the possibility of access probe collisions. This, in turn, may improve overall latency.

Figure 4:
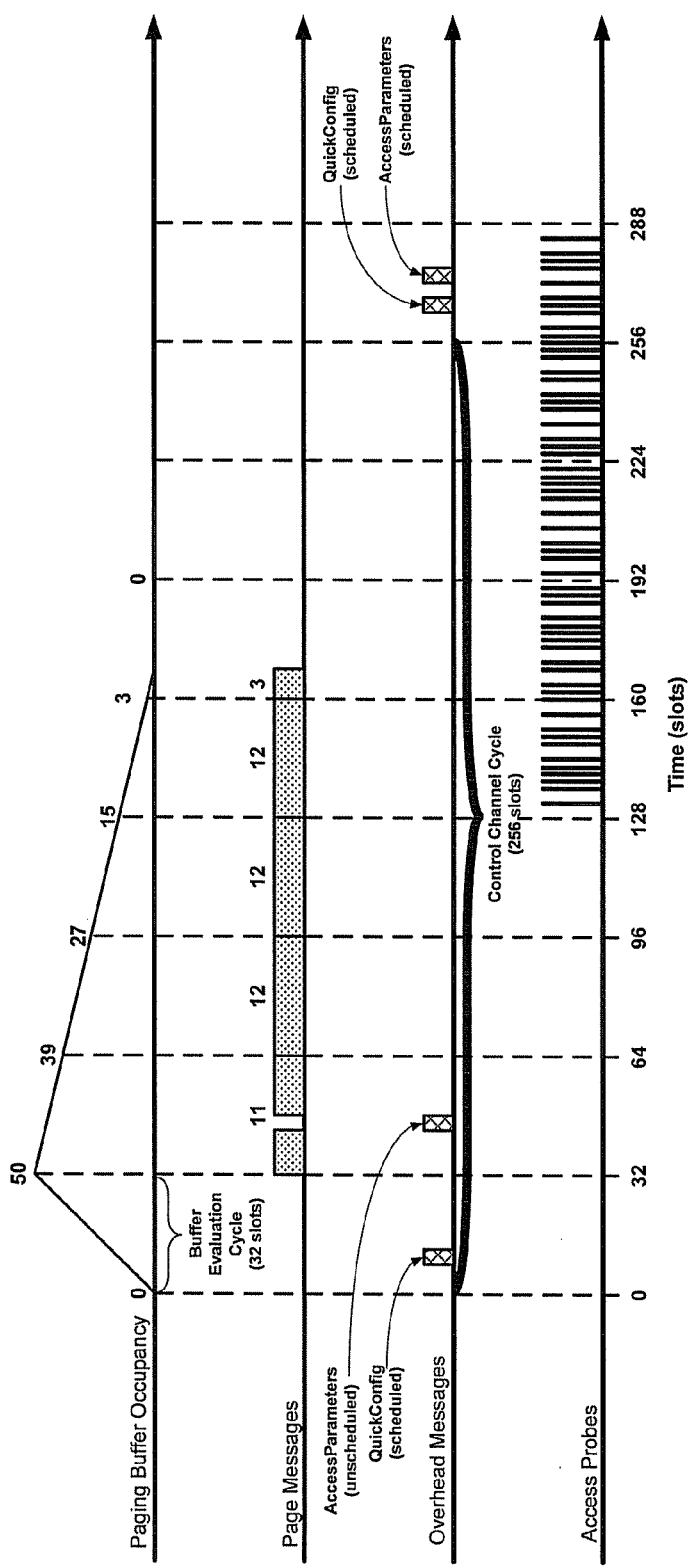
FIG. 4 is a timing diagram illustrating the timing of page messages and overhead transmitted by a radio access network (RAN) and access probes transmitted by mobile stations, in according to an exemplary embodiment.

FIG. 4 is a timing diagram that shows an example of the transmissions from the RAN and from mobile stations that may result when the methods of FIGS. 2 and 3 are applied. More particularly, FIG. 4 shows the paging buffer occupancy, the page messages and overhead messages transmitted by the RAN, and the access probes transmitted by mobile stations to respond to the page messages from the RAN, all as a function of time (measured in time slots). A complete control channel cycle (from time slot 0 to time slot 256) is shown, as well as part of the next control channel cycle (starting at time slot 256).

In this example (which assumes an EVDO air interface), the RAN transmits a scheduled QuickConfig message near the beginning of every control channel cycle. The RAN transmits scheduled AccessParameters messages less frequently. In particular, the scheduled AccessParameters message is not transmitted until after time slot 256. However, as described below, the RAN transmits an unscheduled AccessParameters message after time slot 32, in response to a surge in the occupancy of the paging buffer.

In this example, the buffer evaluation cycle is 32 slots, i.e., the RAN checks the occupancy of the paging buffer every 32 time slots. At time slot 32, the RAN detects a surge in the occupancy of the paging buffer, in that the number of page messages in the paging buffer increased from 0 at time slot 0 to 50 at time slot 32. This surge could be caused, for example, by a group call to mobile stations operating in that wireless coverage area.

After time slot 32, the RAN transmits page messages to try to empty the paging buffer as quickly as possible. The RAN also transmits an unscheduled AccessParameters message that contains updated values of persistence parameters. In this example, the RAN uses the same physical channel, a forward control channel, to transmit page messages and overhead messages. Thus, if the RAN is able to transmit a maximum of 12 page messages during a 32-time slot period, the RAN might transmit only 11 messages between time slots 32 and 64 because of the transmission of the unscheduled AccessParameters message.

As shown in FIG. 4, some of the page messages from the surge may be transmitted before the unscheduled AccessParameters message. However, most of the page messages from the surge are transmitted after the unscheduled AccessParameters message. Moreover, the RAN may continue transmitting page messages until the occupancy of the paging buffer is brought to zero, which does not occur until after time slot 160 in this example. Also shown in FIG. 4 is how mobile stations begin transmitting access probes after time slot 128 in response to the page messages.

At time slot 256, a new control channel cycle begins, and the RAN may transmit another QuickConfig message, followed by a scheduled AccessParameters message. At this point, the occupancy of the paging buffer is zero, so the scheduled AccessParameters message may contain default values of persistence parameters.

In this way, the RAN can change the values of the persistence parameters (e.g., by transmitting an unscheduled AccessParameters message) in response to the surge of paging buffer occupancy, with the result that mobile stations are slower responding to page messages and access probe collisions are reduced. Once the surge has passed, the RAN can restore default values of the persistence parameters (e.g., by transmitting a scheduled AccessParameters message).

Although FIGS. 2, 3, and 4 are described with regard to an EVDO air interface, it is to be understood that other air interfaces could be used. Thus, mobile stations may use other persistence tests or other approaches to determine when to respond to page messages transmitted by the RAN. In addition, the timing of mobile stations' responses to page messages may be affected by access parameters other than or in addition to persistence parameters, and the RAN may change such access parameters by transmitting AccessParameters messages or other types of control messages.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method comprising:
    a radio access network (RAN) accumulating page messages in a paging buffer for subsequent transmission into a wireless coverage area, wherein mobile stations operating in said wireless coverage area are configured to transmit responses to page messages transmitted by said RAN in accordance with a persistence test;
    said RAN detecting a surge in occupancy of said paging buffer, wherein said RAN detecting a surge in occupancy of said paging buffer comprises determining that a first number of page messages occupied said paging buffer at a first time, determining that a second number of page messages occupied said paging buffer at a second time, and determining that said second number exceeds said first number by at least a threshold amount; and
    in response to said surge, said RAN transmitting a control message into said wireless coverage area, wherein said control message changes a persistence parameter of said persistence test from an initial value to an updated value.

2. The method of claim 1, wherein said first time and said second time are predetermined buffer evaluation times.

3. The method of claim 1, wherein each of said mobile stations is configured to transmit transmits a response to a page message in a next access channel cycle if said persistence test is successful but delay transmission of said response for at least a silence period if said persistence test is unsuccessful.

4. The method of claim 3, wherein said persistence test comprises:
    (a) calculating a persistence probability, p, by the formula $p = 2^{(-n/4)}$,
    wherein n is said persistence parameter;
    (b) generating a pseudorandom number, x, between 0 and 1;
    (c) comparing x to p;
    (d) characterizing said persistence test as successful if x<p; and
    (e) characterizing said persistence test as unsuccessful if x≧p.

5. The method of claim 1, wherein said updated value of said persistence parameter reduces a probability of said persistence test being successful as compared to said initial value of said persistence parameter.

6. The method of claim 1, further comprising:
selecting said updated value of said persistence parameter based on occupancy of said paging buffer.

7. The method of claim 1, wherein said RAN periodically transmits overhead messages in accordance with a predetermined schedule, said overhead messages containing current values of access parameters, and wherein said RAN transmits said control message outside of said predetermined schedule.

8. The method of claim 1, further comprising:
said RAN accumulating a plurality of page messages in said paging buffer, wherein said plurality of page messages results in said surge in occupancy;
after transmitting said control message, said RAN transmitting at least some of said plurality of page messages into said wireless coverage area.

9. A method comprising:
a radio access network (RAN) accumulating page messages in a paging buffer during an evaluation time period, wherein said evaluation time period extends from a first evaluation time to a second evaluation time;
said RAN determining that occupancy of said paging buffer has increased by at least a threshold amount during said evaluation time period, wherein said RAN determining that occupancy of said paging buffer has increased by at least a threshold amount during said evaluation time period comprises determining that a first number of page messages occupied said paging buffer at said first evaluation time, determining that a second number of page messages occupied said paging buffer at said second evaluation time, and determining that said second number exceeds said first number by at least said threshold amount;
in response to determining that occupancy of said paging buffer has increased by at least said threshold amount during said evaluation time period, said RAN transmitting a control message, wherein said control message updates a persistence test that determines when mobile stations respond to page messages transmitted by said RAN; and
said RAN subsequently transmitting at least some of said page messages that accumulated in said paging buffer during said evaluation time period.

10. The method of claim 9, wherein said first and second evaluation times are predetermined buffer evaluation times.

11. The method of claim 9, wherein accumulating page messages in a paging buffer during an evaluation time period comprises:
said paging buffer accumulating a plurality of group-call page messages for a group call to a group of mobile stations, wherein said group-call page messages increase occupancy of said page buffer during said evaluation period by at least said threshold amount.

12. The method of claim 11, wherein said control message increases a likelihood that said mobile stations in said group transmit responses to said group-call page messages at different times.

13. A system comprising:
a radio frequency (RF) interface for wireless communication with mobile stations;
a paging buffer for accumulating page messages for subsequent transmission by said RF interface; and
a buffer monitor, wherein said buffer monitor is configured to (i) periodically monitor occupancy of said paging buffer, (ii) detect surges in occupancy of said paging buffer, wherein a surge is indicated when a first number of page messages are in said paging buffer at a first time, a second number of page messages are in said paging buffer at a second time, and said second number exceeds said first number by at least a predetermined amount, and (iii) in response to a detected surge, cause said RF interface to transmit a control message, wherein said control message updates a persistence test that determines when mobile stations respond to page messages transmitted by said RF interface.

14. The system of 13, wherein said control message includes an updated value of a persistence parameter of said persistence test.

15. The system of claim 14, wherein said buffer monitor is configured to select said updated value of said access persistence parameter based on occupancy of said paging buffer.

16. The method of claim 9, wherein said control message includes an updated value of a persistence parameter of said persistence test.

* * * * *